United States Patent [19]

Braun et al.

[11] Patent Number: 4,800,363

[45] Date of Patent: Jan. 24, 1989

[54] METHOD FOR DATA TRANSMISSION VIA AN ELECTRIC DISTRIBUTION SYSTEM AND TRANSMISSION SYSTEM FOR CARRYING OUT THE METHOD

[75] Inventors: Walter Braun, Wettingen; Walter Hagmann, Dättwil; Urs Hanselmann, Zürich; Bruno Maibach, Ennetturgi; Peter Schranz, Arlesheim, all of Switzerland

[73] Assignee: BBC Brown, Boveri & Company, Limited, Baden, Switzerland

[21] Appl. No.: 134

[22] Filed: Jan. 2, 1987

[30] Foreign Application Priority Data

Jan. 15, 1986 [CH] Switzerland ............... 132/86

[51] Int. Cl.$^4$ .................................. H04M 11/04
[52] U.S. Cl. ..................... 340/310 A; 340/310 R; 375/37
[58] Field of Search ......... 340/310 R, 310 A, 310 CP, 340/538, 505, 825.06; 323/361; 375/37

[56] References Cited

U.S. PATENT DOCUMENTS

| | | | |
|---|---|---|---|
| 2,894,208 | 7/1959 | Crow | 331/80 |
| 3,911,415 | 10/1975 | Whyte | 340/310 A |
| 3,962,547 | 6/1976 | Pattantyus-Abraham | 340/310 A |
| 4,065,763 | 12/1977 | Whyte et al. | 340/310 R |
| 4,481,501 | 11/1984 | Perkins | 340/310 R |
| 4,535,447 | 8/1985 | Rosanes et al. | 340/310 R |
| 4,668,934 | 5/1987 | Shuey | 340/310 A |

FOREIGN PATENT DOCUMENTS 2812896 10/1978 Fed. Rep. of Germany ... 340/310 A
2094598 9/1982 United Kingdom .

OTHER PUBLICATIONS

BBC-Nachrichten, vol. 8/9, 1977, pp. 388–395.

Primary Examiner—Donnie L. Crosland
Attorney, Agent, or Firm—Oblon, Fisher, Spivak, McClelland & Maier

[57] ABSTRACT

A method and system for the transmission of data in an electric distribution system between a central controller coupled to a medium-voltage distribution line and at least one terminal coupled to a low-voltage wherein, the transmission of data within the medium-voltage distribution line takes place at a first carrier frequency ($f_1$), and the data at the first carrier frequency is transposed to data at a lower second carrier frequency ($f_{21}$, $f_{22}$) for transmission from the medium-voltage distribution line to the low-voltage distribution line by means of a transponder. Due to this transposing of carrier frequencies, the system can be optimized with respect to the different channel properties of the two communication channels.

2 Claims, 2 Drawing Sheets

METHOD FOR DATA TRANSMISSION VIA AN ELECTRIC DISTRIBUTION SYSTEM AND TRANSMISSION SYSTEM FOR CARRYING OUT THE METHOD

BACKGROUND OF THE INVENTION

1. Field of the Invention

The present invention relates to a method for data transmission via an electric distribution system and to a transmission system for carrying out the method.

2. Discussion of Background

Electric distribution systems which, as a rule, comprise a high-voltage distribution line, a medium-voltage distribution line and a low-voltage distribution line with the corresponding service connections, have long been used as a medium for transmitting data, particularly for the purposes of the electricity supply companies involved.

Thus it is known, for example from the journals BBC-Nachrichten, Volume 8/9, 1977, pages 388 to 395, to use the medium- or high-voltage distribution line of the distribution system as a transmission path for building up so-called multiservice control systems in which control commands are conducted from the electricity supply companies to the consumers.

In such an information transmission system, problems arise for transmission from one level of the distribution system to another distribution line since between the distribution lines appropriate transformers are arranged which, being large inductances, inhibit in particular the propagation of higher frequencies.

The disadvantageous influence of the transformers can be avoided, on the one hand, by connecting in parallel with the transformer a communications bypass which in each case receives the data before the transformer, regenerates them and feeds them in again after the transformer. However, such a bypass solution is very complex, particularly between the medium- and low-voltage distribution line since this includes a plurality of transformers all of which must be bridged if the data transmission is to extend right up to the service connections.

On the other hand, it is possible to transmit data through these transformers with correspondingly low frequencies. However, this has the disadvantage that transmission in the frequency range in question is impaired by strong low-frequency noise containing, above all, harmonics of the power-system frequency.

Data transmission via the medium-voltage distribution line to the individual service connections is therefore possible only with great effort or with low protection against interference in the case of the known solutions.

SUMMARY OF THE INVENTION

The present invention has the object of creating a method for data transmission which brings considerable improvements both with respect to the equipment outlay and with respect to immunity to interference.

The above object, and others, are achieved by providing a new and improved method for transmitting data via an electric distribution system having a high-voltage distribution line, a medium-voltage distribution line and a low-voltage distribution line, wherein data are exchanged between a central controller and at least one terminal via the medium-voltage distribution line and the low-voltage distribution line, and the transmission of the data on the medium-voltage distribution line takes place by means of a first carrier frequency and the transmission from the medium voltage distribution line to the low-voltage distribution line takes place by means of a second carrier frequency which is lower than the first carrier frequency.

By selecting two different carrier frequencies, the higher one of which is used for transmission within the medium-voltage distribution line and the lower one of which is used for local transmission from the medium-voltage distribution line through the transformers to the service connections, the transmission system is optimally matched to the different characteristics of the two communication channels which are different from each other. The higher first carrier frequency ensures low-noise propagation within the medium-voltage distribution line. The lower second carrier frequency allows transmission with little attenuation by the transformers between the medium- and low-voltage distribution line.

Considering the characteristics of the conventional distribution systems as communication channels, it is particularly advantageous for data transmission if the first carrier frequency is within the range between 20 kHz and 140 kHz and the second carrier frequency is within the range between 4 kHz and 20 kHz.

It is also found to be advantageous to use a PSK modulation method (PSK=Phase Shift Keying) for transmission within the medium-voltage distribution line by means of the first carrier frequency because such a method is particularly economical with respect to energy.

In addition, further improvements can be achieved in the transmission characteristics if the transmission in the medium-voltage distribution line takes place with a continuously changing first carrier frequency (so-called FH=Frequency Hopping) because peaks in the curve of the propagation attenuation can then be easily circumvented so that all subscribers to the transmission are reached equally well on average.

The transmission system according to the invention has a central controller which is coupled to the medium-voltage distribution line after a substation located between high- and medium-voltage distribution lines. From this controller, the data, modulated onto the first carrier frequency, reach a transponder which is also coupled to the medium-voltage distribution line at another point and which converts the data to the second carrier frequency and feeds the converted data back into the medium-voltage distribution line. The data then reach the appropriate service connections via the nearest low-voltage transformers.

In larger distribution systems, a plurality of transponders which automatically cover adjacent local carriers are provided at the medium-voltage network. To avoid mutual interference in this case, it is advantageous for adjacent transponders to transpose the data to different second carrier frequencies.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
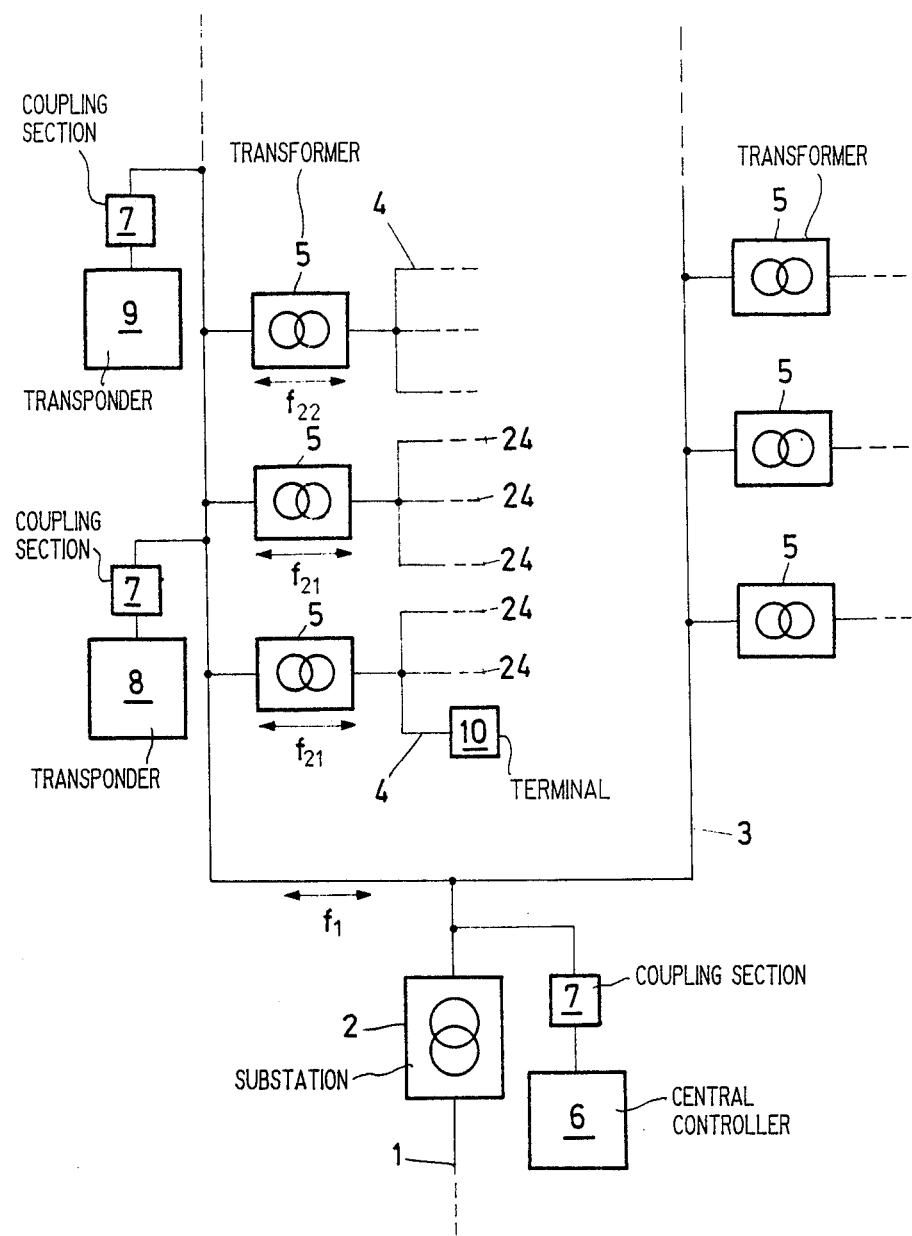
FIG. 1 is a schematic block diagram of a transmission system according to a preferred illustrative embodiment of the invention.

Referring now to the drawings, wherein like reference numerals designate identical or corresponding parts throughout the several views, FIG. 1 diagramatically shows the configuration of a transmission system based on an electric distribution system according to a preferred illustrative embodiment of the invention.

The electric distribution system comprises a high-voltage distribution line 1 with a voltage of, for example, 110 or 220 kV, of which only a small section is shown in FIG. 1, a medium-voltage distribution line 3 with a voltage of, for example, 10 to 30 kV and a low-voltage distribution line 4 with a service connection voltage of 110, 220 or 380 V.

High-voltage distribution line 1 and medium-voltage distribution line 3 are coupled to each other by appropriate transformers via a substation 2. Similarly, a coupling of the medium-voltage distribution line 3 to the low-voltage distribution lines 4 exist via comparable low-voltage transformers 5 which are arranged distributed along the medium-voltage network 3. Each low-voltage network 4 branches into a plurality of service connections 24 one of which is occupied by a terminal 10 for receiving and transmitting data in FIG. 1.

The data are transmitted between the terminal 10 and other terminals, not drawn, and a central controller 6 which is coupled to the medium-voltage distribution line via a coupling section 7 on the medium-voltage side of the substation 2.

The coupling section 7 can be, for example, a coupling capacitor such as is known from the printed document initially mentioned.

Figure 2:
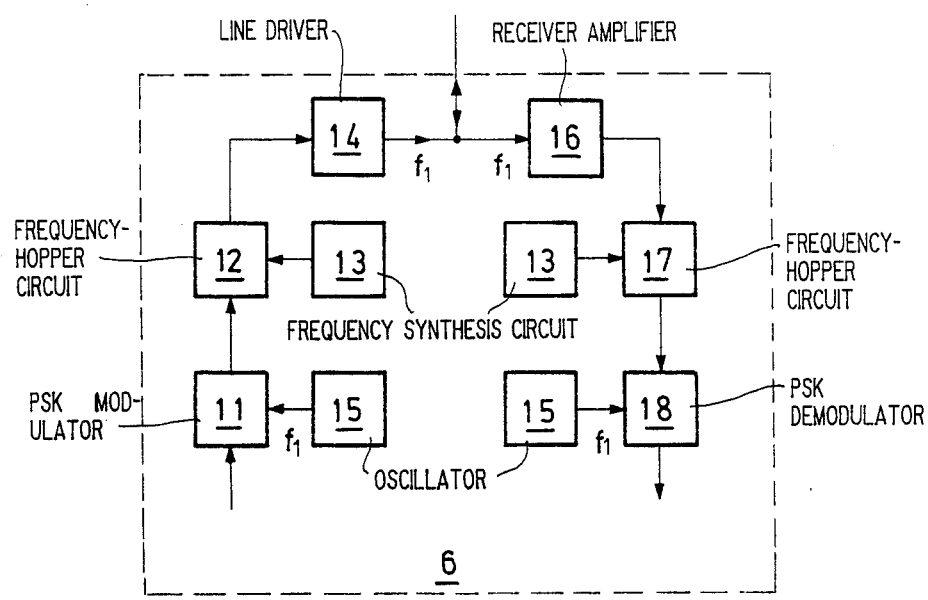
FIG. 2 is a block diagram of the internal configuration of a central controller according to FIG. 1.

The central controller 6, the internal configuration of which is shown in a preferred illustrative embodiment in FIG. 2, transmits data to or receives data from the medium-voltage level 3, which data are transmitted by means of a first carrier frequency $f_1$. These data go to or come from at least one transponder 8, 9 which is also coupled in via a coupling section 7 in the vicinity of one or more low-voltage transformers 5. The internal configuration of such a transponder 8, 9 is reproduced in an illustrative embodiment in FIG. 3 in the form of a block diagram.

In the transponder 8, 9, the data transmitted with the first carrier frequency $f_1$ by the central controller 6 are received, converted to a second carrier frequency $f_{21}$, $f_{22}$ which is lower than $f_1$ and are fed back into the medium-voltage distribution line 3 at this second carrier frequency. Transmission of the transposed data takes place with a comparatively short range so that the data only reach the associated service connections 24, via the nearest low-voltage transformers 5.

To supply larger areas with a large number of service connections 24, therefore a large number of transponders 8, 9 is arranged along the medium-voltage distribution line 3, each of which transponders covers local areas. To avoid mutual interference between adjacent transponders, it is expedient to select different frequencies ($f_{21}$ and $f_{22}$ in this case) for the second carrier frequency $f_{21}$, $f_{22}$, in such a manner that adjacent transponders always operate with different second carrier frequencies. Thus, in the example of FIG. 1, the upper transponder 9 operates with a second carrier frequency $f_{22}$ (as indicated by the double arrow) whereas the lower transponder 8 exchanges data with the corresponding service connections 24 at the second carrier frequency $f_{21}$ (also indicated by double arrows).

The transponders 8, 9 therefore represent links between the central controller 6 and the terminals 10 at the service connections 24 which links, on the one hand, communicate centrally with the central controller 6 at the first carrier frequency $f_1$ and, on the other hand, communicate locally with the terminals 10 at a large number of second carrier frequencies $f_{21}$, $f_{22}$.

In the conventional distribution systems, the first carrier frequency $f_1$ is preferably within a frequency range from 20 kHz to 140 kHz. As a result, a relatively large range is achieved on the medium-voltage distribution line without greater interference occuring due to mains harmonics. In particular, the entire frequency range specified is utilized if transmission between the central controller 6 and the transponders 8, 9 takes place on continuously changing first carrier frequencies in accordance with the principle of "Frequency Hopping" (FH). This part of the transmission will be discussed in greater detail in the text which follows.

The second carrier frequencies $f_{21}$, $f_{22}$ are clearly below the first carrier frequency $f_1$ in a preferred frequency range from 4 kHz to 20 kHz. This ensures that the data can be exchanged between the transponders 8, 9 and the terminals 10 directly via the low-voltage transformers 5 without a bypass circuit, without the transmission being disturbed too much by mains harmonics. This frequency range can also be fully exhausted if a FH system is also used in this communication channel. On the other hand, a sufficiently large number of fixed second carrier frequencies $f_{21}$, $f_{22}$ can be selected from this frequency range to make different frequencies available to adjacent transponders 8, 9.

The types of modulation to be considered for transmitting data at the first carrier frequency $f_1$ and the second carrier frequency $f_{21}$, $f_{22}$, are, in addition to frequency modulation (FSK=Frequency Shift Keying), especially phase modulation (PSK=Phase Shift Keying), particularly in the form of m-PSK with m different phase angles. The simplest subcase is bi-phase modulation (BPSK=Bi-Phase Shift Keying). In addition to normal phase modulation, differential phase modulation (DPSK=Differential Phase Shift Keying) can also be successfully used.

The types of phase modulation have the special advantage that they can be used for transmitting data in a manner which is particularly favorable with respect to energy, as a result of which the system cost can be kept down at the same time.

The block diagram of the central controller 6 for the example of a communication channel with PSK and FH comprises a transmitting section and a receiving section. The transmitting section contains a PSK modulator 11 having a data input and another input into which the carrier frequency coming from an oscillator 15 is fed. The phase-modulated carrier frequency passes from the PSK modulator 11 to a frequency-hopper circuit 12 in the transmitter, which is connected to a frequency-synthesis circuit 13 and which generates from the incoming signal a phase-modulated signal having a continuously changing carrier frequency. Following the frequency-hopper circuit 12, a line driver 14 can also be provided which sufficiently amplifies the signal to be able to cover the entire medium-voltage distribution line 3. From the line driver 14, the phase-modulated signal passes via a common input/output line and the coupling section 7 to the medium-voltage distribution line 3.

Analogously, the receiving section contains, in addition to the frequency synthesis circuit 13 and the oscillator 15, a frequency-hopper circuit 17 in the receiver and a PSK demodulator 18 which recover the data from the incoming FH/PSK signal.

The principles of FH/PSK transmission are known, for example, from the article by C. E. Cook and H. S. Marsh, "An Introduction to Spread Spectrum", IEEE Communications Magazine, March 1983, pages 8–16.

Figure 3:
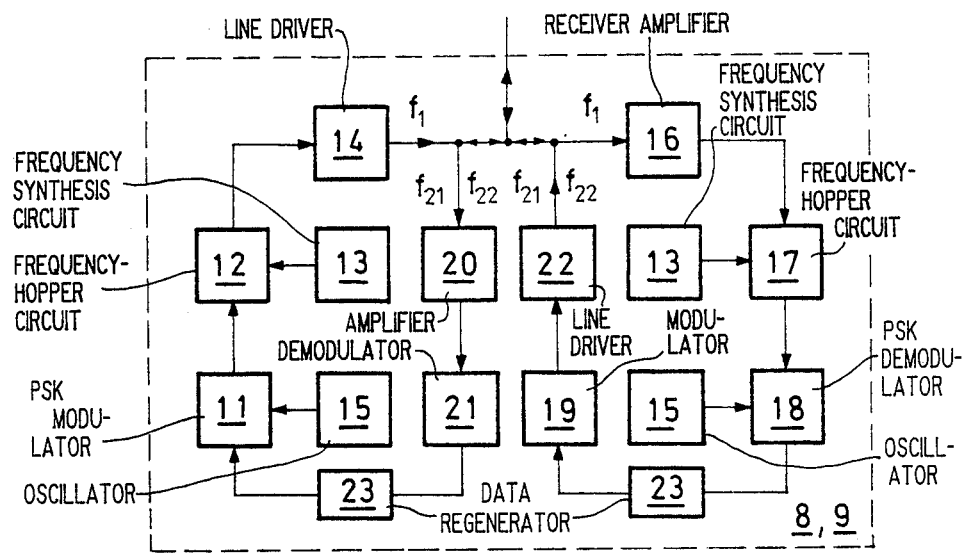
FIG. 3 is a block diagram of the internal configuration of a transponder according to FIG. 1.

The transponder 8, 9 according to FIG. 3 contains two transmitting/receiving sections. One transmitting/receiving section receives the data from the terminals 10, transposes them and sends them to the central controller 6. The other transmitting/receiving section is responsible for transmission in the opposite direction.

The data modulated onto the second carrier frequency $f_{21}$ $f_{22}$ pass via a common input and output line connecting the transponder 8, 9 via the coupling section 7 to the medium-voltage level 3, to a LF demodulator 21, preferably after having been preamplified in a preceding LF receiver amplifier 20. The prefix LF (=Low Frequency ) is here used for the sake of simplicity to distinguish between the circuits operating within the range of the second carrier frequency (preferably 4–20 kHz) and those operating within the range of the first carrier frequency.

The data demodulated in the LF demodulator 21 are regenerated, for example in a regenerator 23, and are then transmitted FH/PSK-modulated via the medium-voltage distribution line 3 to the central controller 6 via the transmitting section consisting of blocks 11–15, corresponding to the transmitting section from FIG. 2.

The transmitting/receiving section described and arranged on the left-hand side of FIG. 3 corresponds to a transmitting/receiving section shown on the right-hand side operating in the reverse manner, the receiving section of which, corresponding to the receiving section from FIG. 2, comprises blocks 13, 15, 16–18 and the transmitting section of which essentially consists of an LF modulator 19 which can be followed by an LF line driver 22. Here too, a regenerator 23 is provided between the PSK demodulator 18 and the LF modulator 19 in the example of FIG. 3.

Similarly to the PSK modulator 11 and the PSK demodulator 18, the LF modulator 19 and the LF demodulator 21 can also be constructed as PSK modulators or demodulators if PSK modulation is used for transmission between transponder 8, 9 and terminal 10. However, other types of modulation such as, for example, FSK can be implemented just as well.

The configuration, not shown, of the transceiver in the terminal resembles that of FIG. 2, with the difference that, instead of blocks 11–15 and 13, 15–18, the corresponding blocks 19, 22 and 20, 21 have to be inserted into the configuration of FIG. 3.

Overall, the invention provides a method and a system for two-way communication between the central controller 6 and the terminals 10 in which the signals can be optimally matched to the given conditions of the particular communication channel. The two components of the transmission system, namely transmission with the first and the second carrier frequency, can be separately optimized, particularly with respect to the data rates, the signal formats and the signal powers which leads to a communication system in the distribution system having clearly improved transmission characteristics.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for transmitted data via an electric distribution system having a high-voltage distribution line, a medium-voltage distribution line and a low-voltage distribution line, wherein data are exchanged between a central controller and at least one terminal via the medium-voltage distribution line and the low-voltage distribution line, comprising:

transmitting data on the medium-voltage distribution line at a first carrier frequency in the range between 20 KHz and 140 KHz; and
   transmitting data from the medium-voltage distribution line to the low-voltage distribution line at a second carrier frequency in the range between 4 KHz and 20 KHz;
   wherein the first carrier frequency is continuously changed and is phase modulated for transmission at the medium-voltage distribution line.

2. A transmission system for transmitting data via an electric distribution system having a high-voltage distribution line, a medium voltage distributution line coupled to said high-voltage distribution line by means of a substation, and a low-voltage distribution line coupled to said medium-voltage distribution line, comprising:

a central controller coupled to the medium-voltage distribution line for transmitting data at a first carrier frequency on said medium-voltage distribution line;
   a plurality of transponders coupled to the medium-voltage distribution line for receiving the data transmitted at the first carrier frequency from the medium-voltage distribution line, converting the received data to data at respective second carrier frequencies, and feeding the converted data at the respective second carrier frequencies back to said medium-voltage distribution line, whereby said converted data at said second carrier frequencies is coupled to said low-voltage distribution line;
   a terminal coupled to said low-voltage distribution line and including a transceiver for receiving the converted data at said second carrier frequency,
   said central controller comprising a transmitter including PSK modulator and a frequency-hopper circuit, and a receiver including a corresponding PSK demodulator and a frequency-hopper circuit, all of which operate within the range of the first carrier frequency;
   each said transponder comprising first and second transceivers which operate in parallel, said first transceiver comprising an LF demodulator for demodulating the data transmitted at the respective second carrier frequency and a subsequent PSK modulator and a subsequent frequency-hopper circuit at a transmitter of the first transceiver for modulating the demodulated data and transmitting the modulated demodulated data at the first carrier frequency, and the second transceiver comprising in the reverse order, a frequency-hopper circuit at a receiver of the second transceiver, a PSK demodulator for demodulating data at said first carrier frequency, and an LF modulator for modulating the demodulated data at the respective second carrier frequency, wherein adjacent transponders transpose the data at said first carrier frequency to different second carrier frequencies.

* * * * *